(12) United States Patent
Briglia et al.

(10) Patent No.: US 8,852,318 B2
(45) Date of Patent: Oct. 7, 2014

(54) METHOD AND APPARATUS FOR DRYING AND COMPRESSING $CO_2$-RICH FLOW

(75) Inventors: Alain Briglia, Corze (FR); Arthur Darde, Paris (FR)

(73) Assignee: L'Air Liquide, Societe Anonyme pour l'Etude et l'exploitation des Procedes Georges Claude, Paris (FR)

( * ) Notice: Subject to any disclaimer, the term of this patent is extended or adjusted under 35 U.S.C. 154(b) by 106 days.

(21) Appl. No.: 13/517,256

(22) PCT Filed: Dec. 21, 2010

(86) PCT No.: PCT/FR2010/052858
§ 371 (c)(1),
(2), (4) Date: Jun. 20, 2012

(87) PCT Pub. No.: WO2011/086289
PCT Pub. Date: Jul. 21, 2011

(65) Prior Publication Data
US 2012/0272680 A1    Nov. 1, 2012

(30) Foreign Application Priority Data

Dec. 22, 2009  (FR) ..................... 09 59370

(51) Int. Cl.
*B01D 53/14*     (2006.01)
*F25J 3/02*      (2006.01)
*B01D 53/26*     (2006.01)

(52) U.S. Cl.
CPC ............... *B01D 53/265* (2013.01); *Y02C 10/12* (2013.01); *F25J 2230/30* (2013.01); *B01D 2256/22* (2013.01); *F25J 3/0266* (2013.01); *F25J 2220/84* (2013.01); *F25J 2220/82* (2013.01); *F25J 2205/04* (2013.01); *F25J 2290/44* (2013.01); *F25J 2220/80* (2013.01); *F25J 2205/50* (2013.01); *F25J 2270/90* (2013.01); *B01D 53/263* (2013.01); *Y10S 62/928* (2013.01)
USPC ........ 95/42; 62/617; 62/928; 95/156; 95/197; 95/228; 95/236; 95/241; 96/155; 96/236; 96/242

(58) Field of Classification Search
CPC ............ B01D 2256/22; B01D 53/263; B01D 53/265; F25J 2205/04; F25J 2205/50; F25J 2220/80; F25J 2220/82; F25J 2220/84; F25J 2230/30; F25J 2270/90; F25J 2290/44; F25J 3/0266; Y02C 10/12
USPC ...................................... 95/236; 62/617, 928
See application file for complete search history.

(56) References Cited

U.S. PATENT DOCUMENTS 2,862,819 A    12/1958  Hougen et al.
4,252,548 A     2/1981  Markbreiter et al.
(Continued)

FOREIGN PATENT DOCUMENTS

GB        877091        9/1961
WO    WO2009127217    10/2009

OTHER PUBLICATIONS

PCT/FR2010/052858, International Search Report, May 24, 2011 (6 pp).

*Primary Examiner* — Duane Smith
*Assistant Examiner* — Cabrena Holecek
(74) *Attorney, Agent, or Firm* — Justin K. Murray

(57) ABSTRACT

In a method for compressing a water-containing CO2-rich fluid wherein the CO2-rich fluid is compressed in a compressor located upstream from the compression step, an antifreeze agent is injected into the water-containing CO2-rich fluid in order to lower the water solidification temperature. The antifreeze agent-containing CO2-rich fluid is frozen, water is extracted from the frozen fluid, and the frozen fluid is compressed in the compressor.

18 Claims, 1 Drawing Sheet

(56) References Cited

U.S. PATENT DOCUMENTS

| | | | |
|---|---|---|---|
| 4,599,096 A * | 7/1986 | Burr | 62/624 |
| 4,704,146 A | 11/1987 | Markbreiter et al. | |
| 8,585,802 B2 * | 11/2013 | Keller | 95/45 |
| 2002/0117391 A1 * | 8/2002 | Beam | 203/81 |
| 2009/0101007 A1 * | 4/2009 | Find | 95/42 |
| 2009/0255181 A1 * | 10/2009 | Rhinesmith et al. | 48/127.9 |

* cited by examiner

US 8,852,318 B2

METHOD AND APPARATUS FOR DRYING AND COMPRESSING $CO_2$-RICH FLOW

CROSS-REFERENCE TO RELATED APPLICATIONS

This application is a §371 of International PCT Application PCT/FR2010/052858, filed Dec. 21, 2010, which claims §119(a) foreign priority to French patent application 0959370, filed Dec. 22, 2009.

TECHNICAL FIELD OF THE INVENTION

The present invention relates to a process and to a unit for drying and compressing a $CO_2$-rich stream.

BACKGROUND

The compression of $CO_2$-rich and wet streams requires the use of a compressor made of stainless steel—or even made of materials that are more noble still, such as steels that have a high nickel content—in order to prevent corrosion by carbonic acid, or by other stronger acids that might result from the presence of impurities in the $CO_2$-rich stream, such as nitrogen oxides or sulfur oxides.

A $CO_2$-rich fluid contains between 1 mol % and 100 mol % of $CO_2$ on a dry basis. Ambient air is 25 times more depleted in $CO_2$ than the bottom limit of 1 mol %.

It is in this way that the prior art for the treatment of such $CO_2$-rich streams is schematically represented, as in FIG. 1.

1=provision of the $CO_2$-rich stream (examples: outlet of a column for regenerating a solvent (amine type) or oxycombustion flue gases after a primary filter of electrostatic or bag filter type 3=optional step of fine purification (to a typical level of the order of 1 part per million) of sulfur-containing elements 5=compression in a compressor, the materials of which in contact with the wet gas are made of corrosion-resistant steel 7=drying of the gas by adsorption (for example adsorbent of activated alumina, molecular sieve or silica gel type)

9=optionally purifying the $CO_2$-rich gas of its light constituents (oxygen, argon, hydrogen, carbon monoxide, nitrogen, etc.) and/or of its heavier constituents ($NO_2$, $N_2O_4$, $SO_2$, etc.), the possible variants of this step are described at length in previous patent applications;

11=step of compression of the $CO_2$-rich final product or of liquefaction of the $CO_2$-rich final product in order to make it available to a system of transport (by pipeline or boat) or for its use in a process.

It is known from U.S. Pat. No. 2,862,819 to separate a stream of $CO_2$-rich gas by distillation, after having mixed it with an antifreeze before compressing it in a compressor.

SUMMARY

According to one subject of the invention, a process is provided for compressing a water-containing $CO_2$-rich fluid wherein the $CO_2$-rich fluid is compressed in a compressor, upstream of the compression step, the water-containing $CO_2$-rich fluid is divided into two, an antifreeze is injected into a first portion of the water-containing $CO_2$-rich fluid, a second portion of the $CO_2$-rich fluid is sent to the bottom of a degassing column and an overhead gas from the column is mixed with the first portion of the antifreeze-containing $CO_2$-rich fluid, the first portion is cooled then sent into a phase separator, water containing the antifreeze is extracted from the phase separator and sent to the top of the column and the cooled fluid that is purified of water in the phase separator is compressed in the compressor.

Optionally:

The compressor is made of carbon steel or weakly alloyed steel.

The water containing the antifreeze is treated in the column in order to extract therefrom most of the antifreeze which is recycled upstream of the cooling step.

The gas at the inlet of the phase separator is at between −35° C. and −15° C., or even between −25° C. and −15° C.

Downstream of the compressor, the compressed fluid is separated at a temperature below the solidification point of water, 0° C., preferably below −10° C. without having dried it by adsorption upstream.

Water-rich and antifreeze-containing condensates are recovered during the separation at a temperature below 0° C. and the antifreeze is recycled after extraction upstream of the cooling step.

Water-rich and antifreeze-containing condensates are recovered during the separation at a temperature below −10° C. and the antifreeze is recycled after extraction upstream of the cooling step.

The antifreeze is extracted in the column.

The $CO_2$-rich fluid contains less than 100 ppm vol of sulfur oxides, or less than 2000 ppm vol of sulfur oxides, or even less than 20 000 ppm vol of sulfur oxides.

According to another aspect of the invention, a unit is provided for compressing a water-containing $CO_2$-rich fluid comprising a compressor, and, upstream of the compressor, an antifreeze inlet line for injecting the antifreeze into a first portion of the water-containing $CO_2$-rich fluid, means for cooling the antifreeze-containing $CO_2$-rich fluid, a phase separator for extracting water from the cooled fluid, a degassing column, means for sending a second portion of the water-containing $CO_2$-rich fluid to the bottom of the column, means for sending water from the phase separator to the top of the column, means for sending the overhead gas from the column in order to be mixed with the first portion upstream of the cooling means, and means for sending the cooled fluid that is purified of water to the compressor.

The compressor is optionally made of carbon steel.

The unit may comprise a compressor in order to compress the second portion upstream of the column.

By this means, it is not necessary to treat all the $CO_2$-rich fluid in a distillation column but only the portion intended to purify the mixture of water and antifreeze in the degassing column.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
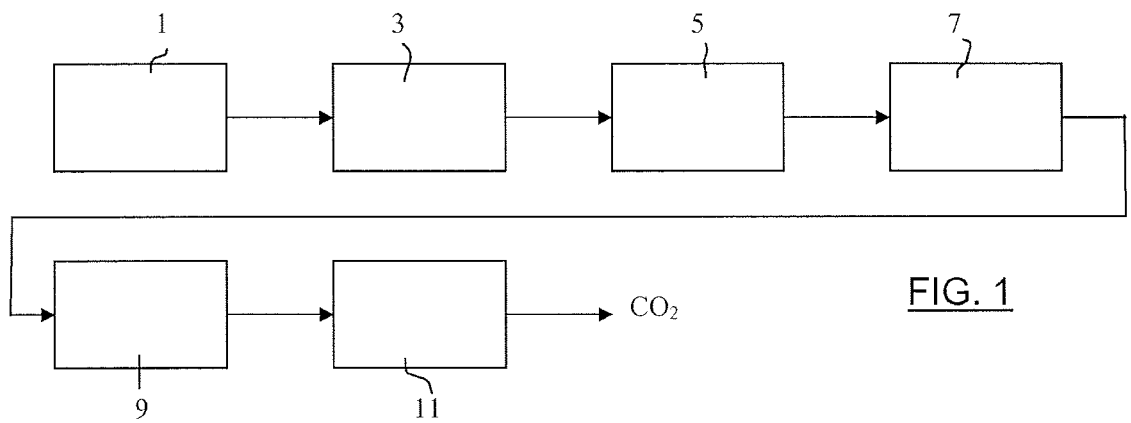
FIG. 1 represents a schematic in accordance with an embodiment of the prior art.

The present invention aims to considerably reduce the cost of the compression unit 5 and optional purification unit 3 of the $CO_2$-rich stream by removing enough water upstream of the compression step 5 to avoid the condensation thereof during the successive compression and cooling phases in the compressor, which enables the use of carbon steel or weakly alloyed steel instead of stainless steel.

A second aspect of the invention consists in reducing the cost of the drying unit 7 when a purification by partial condensation and optional distillation is desired in order to improve the composition of the $CO_2$ produced. The main role of this unit is to remove enough water from the $CO_2$-rich stream to prevent this water from freezing during the cooling in the unit 9. Residual water contents of the order of one part per million may thus be necessary to prevent freezing at $-56°$ C., a minimum temperature due to the solidification of $CO_2$.

Firstly, it will be considered how to do without the drying unit, while cooling the $CO_2$-rich stream to around $-55°$ C.

The invention consists in injecting an antifreeze—methanol for example—in a sufficient amount so that the solidification point of the water is below the coldest temperature of the unit 9 (for example for a water solidification point of $-54°$ C., it is necessary to inject at least 1 kg of methanol, per 1 kg of water contained in the gas) then in cooling the mixture to the desired temperature.

An improvement consists in cooling the antifreeze-containing gas to an intermediate temperature, for example between $-35°$ C. and $-15°$ C., obviously above the desired final temperature, so that a significant fraction of the water, and of the antifreeze contained is condensed and thus recycled, limiting the consumption of the antifreeze. The colder the temperature reached, the greater the condensation of water. The gas resulting from this intermediate condensation is then cooled to the temperatures desired for the remainder of the process.

It is possible to envisage a second injection of antifreeze after this first condensation, depending on the resulting fractions of water and antifreeze in the gas phase. The advantage of a multiple injection will be to reduce the total amount to be injected since each injection will be adapted to the condensation that follows. However, since the system becomes more complex, a technico-economic study will assess the advantage of multiplying the injections of antifreeze.

A similar approach makes it possible to remove enough water before the compression to use a compressor made of carbon steel or weakly alloyed steel. It is therefore a question of cooling the $CO_2$-rich stream until the remaining fraction of water ensures that the dew point will never be reached in the various compression and cooling stages of the compressor. Thus, cooling of a stream containing around 90% of $CO_2$ by volume and on a dry basis to $-15°$ C. and 0.9 bar absolute makes it possible to lower the dew point at the outlet of the compressor (20 bar absolute in our example) to less than $30°$ C., i.e. a temperature for which it is possible to easily ensure that it will not be reached during interstage coolings and at the outlet of the compressor. A control of the temperature of the compressed stream by regulation of the flow rate of cooling water as a function of the temperature of the gas at the outlet of the cooler is one example that makes it possible to keep the compressed stream above the dew point and therefore the corrosion zone.

Compared to the existing process, it is therefore necessary to add means for injecting an antifreeze into the $CO_2$-rich stream, and also advanced cooling means in order to reach temperatures of the order of $-15°$ C. at low pressure (in general a pressure close to atmospheric pressure).

The advantages of this invention are numerous:
The compressor and the interstage coolers are therefore made of carbon steel or weakly alloyed steel.

The suction temperature is significantly lowered compared to the prior art: between a suction at $20°$ C. and a suction at $-15°$ C., the volume flow rate—and therefore the size of the first compression impeller, which defines the size of the compressor, decreases by 7% if a pressure drop of 100 mbar is considered for the cooling (from 1 bar absolute to 0.9 bara). This results in an investment saving for the machine.

The suction temperature is stabilized over the year, which makes it possible to operate exactly under the design conditions and therefore to improve the mean efficiency of the machine.

The compressor should not be sized for a high suction temperature which will only be encountered for a few days in the year.

The compression power is significantly reduced, both due to the absence of most of the water molecules and by the colder suction.

The compressor acts as a very efficient mixer for the antifreeze in the gas to be treated. This is of prime importance upstream of the purification unit 9, since the residual water content is very low (of the order of a few hundreds of parts per million), the amount of antifreeze to be injected is also very low, which makes the injection of the antifreeze very tricky, since it is necessary to ensure that the mixing is very homogeneous (antifreeze in the gas).

Specifically it is found that the fraction of antifreeze remaining in the vapor phase is substantially the same as the fraction of water and thus ensures that the intermediate injections of antifreeze are superfluous.

Costly adsorption-drying equipment is avoided.

The energy penalty of the regeneration of the adsorption unit is avoided.

Another variant of the invention consists in considering that in the absence of water, sulfur oxides and nitrogen oxides will not condense in acid form. As regards nitric acid, since its dew point is close to that of water, the situation does not change, as a first approximation, whether they are considered or not. As regards sulfuric acid, its dew point varies between $70°$ C. and $150°$ C. approximately depending on the pressures and concentrations considered.

The invention therefore consists in not purifying the $CO_2$-rich stream of sulfur oxide before the compression. The sulfur oxides will then be either separated at high pressure, by distillation for example, or co-sequestered with the $CO_2$ if this is the chosen application for the $CO_2$.

The saving for a unit that produces $CO_2$-rich gas may be considerable if a coal-fired power plant is considered where it could become possible to envisage not removing the $SO_2$ from the stream that will be extracted for sequestration.

It remains to mention the antifreeze cycle. Most of the antifreeze will be condensed with the water, and also other impurities of the $CO_2$-rich stream. Regeneration of the antifreeze is possible by using a gas/liquid contactor that will use a portion of the $CO_2$-rich gas taken before any injection of antifreeze. The contactor will make it possible to recover almost all of the antifreeze. The gas is then mixed with the remainder of the $CO_2$-rich gas, thus reducing the make-up of antifreeze to the extremely reduced fractions remaining in the product and in the condensates.

The condensates may be sent to the boiler, if there is a boiler, for destruction of the traces of antifreeze.

Finally, the traces of antifreeze and of water remaining in the $CO_2$-rich product should not hamper the sequestration of the latter, nor even the use thereof for enhanced oil recovery. It should however be noted that, close to the critical point of $CO_2$ (74 bar absolute and 31.1° C.), the antifreezes (in general alcohols, and especially methanol) and water form liquid phases independent of the $CO_2$ which may be either liquid or gaseous. A recovery of an additional fraction of antifreeze, accompanying an improvement in the purity of the $CO_2$ product can therefore be envisaged.

Figure 2:
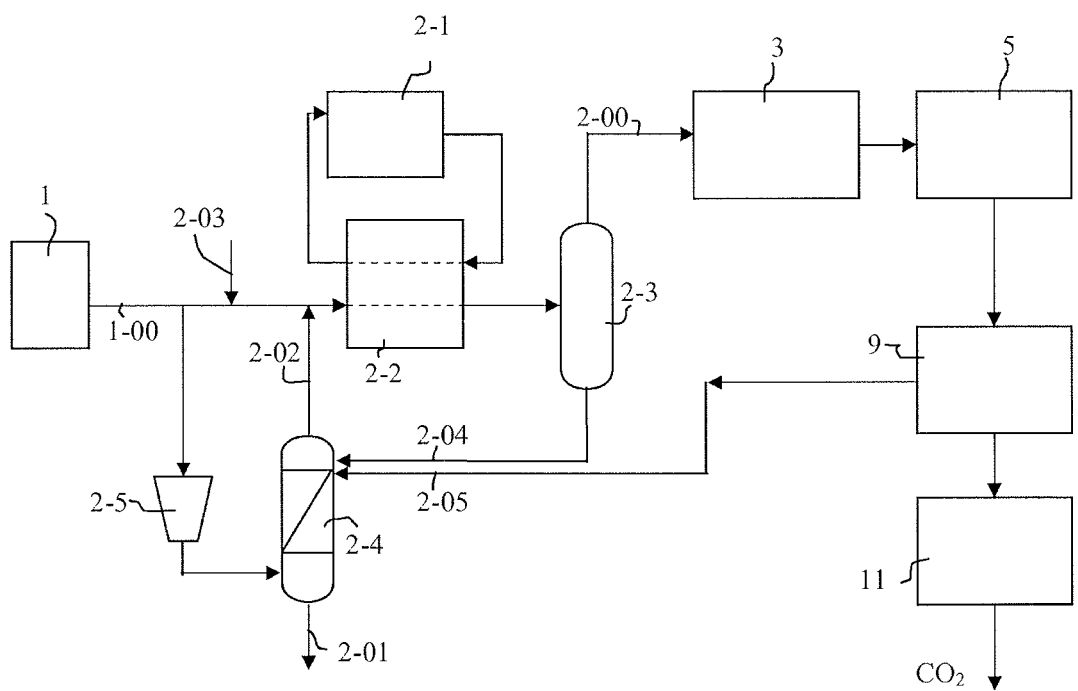
FIG. 2 represents a schematic in accordance with an embodiment of the invention.

FIG. 2 illustrates a process according to the invention.

A $CO_2$-rich and wet fluid 1-00 is divided into two. One portion is sent to a blower 2-5 feeding a degassing column 2-4. A make-up of antifreeze 2-03, for example of methanol, is added to the rest of the $CO_2$-rich fluid. The mixture is cooled in a heat exchanger 2-2 to a temperature between −35° C. and −15° C. and sent to a phase separator 2-3 in order to separate the antifreeze-rich condensates therefrom. These condensates are sent to the column 2-4 and the overhead gas 2-02 is recycled to the $CO_2$-rich and wet fluid. The antifreeze-rich bottoms liquid 2-01 is sent back to cooling in the heat exchanger 2-2 in order to limit the consumption of antifreeze. The heat exchanger 2-2 is cooled by a refrigerating unit. It is preferably of the brazed aluminum plate heat exchanger type. Optionally, in order to reduce the operating costs, the $CO_2$-rich fluid may be cooled in several steps, i.e. several coolings in series (cooling water, R134a, aqueous ammonia).

The overhead gas 2-00 from the separator 2-3 is optionally sent to a fine purification step as in the prior art and then the gas is compressed in a compressor 5 made of carbon steel or weakly alloyed steel. Following next are possibly an optional purification 9 of the $CO_2$-rich gas of its light constituents (oxygen, argon, hydrogen, carbon monoxide, nitrogen, etc.) and/or of its heavier constituents ($NO_2$, $N_2O_4$, $SO_2$, etc.), the possible variants of this step are described at length in previous patent applications and possibly a step of compression 11 of the $CO_2$-rich final product or of liquefaction of the $CO_2$-rich final product in order to make it available to a system of transport (by pipeline or boat) or for its use in a process.

Preferably, the $CO_2$-rich fluid to be treated by the process of the invention does not contain $NO_2$.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

What is claimed is:

1. A process for compressing a CO2-rich fluid comprising CO2 and water, the method comprising the steps of:

dividing the CO2-rich fluid into a first portion and a second portion upstream of a compressor;
   injecting an antifreeze into the first portion to create an antifreeze-containing CO2-rich fluid;
   sending the second portion of the CO2-rich fluid to a bottom of a degassing column;
   mixing an overhead gas from the degassing column with the antifreeze-containing CO2-rich fluid to create a mixture,
   cooling the mixture and then sending the mixture into a phase separator;
   extracting water containing antifreeze from the phase separator leaving a cooled CO2-rich fluid within the phase separator, wherein the cooled CO2-rich fluid contains a substantial amount less water as compared to the CO2-rich fluid;
   sending the water containing antifreeze to a top of the degassing column; and
   withdrawing the cooled CO2-rich fluid from the phase separator and comprising the cooled CO2-rich fluid in the compressor to produce a compressed fluid.

2. The process as claimed in claim 1, wherein the compressor is made of carbon steel or weakly alloyed steel.

3. The process as claimed in claim 1, further comprising the step of treating the water containing the antifreeze in the degasser column in order to extract therefrom most of the antifreeze which is recycled upstream of the cooling step.

4. The process as claimed in claim 1, further comprising the step of separating the compressed fluid downstream of the compressor at a temperature below the solidification point of water without having dried the compressed fluid by adsorption upstream.

5. The process as claimed in claim 4, wherein the temperature is below −10° C.

6. The process as claimed in claim 1, further comprising the step of recovering water-rich condensates and antifreeze-containing condensates during the separation at a temperature below 0° C. and recycling the antifreeze-containing condensates after extraction upstream of the cooling step.

7. The process as claimed in claim 6, further comprising the step of extracting the antifreeze in the degasser column.

8. The process as claimed in claim 1, further comprising the step of recovering water-rich condensates and antifreeze-containing condensates during the separation at a temperature below −10° C. and recycling the antifreeze-containing condensates after extraction upstream of the cooling step.

9. The process as claimed in claim 8, further comprising the step of extracting the antifreeze in the degasser column.

10. The process as claimed in claim 1, wherein the CO2-rich fluid contains less than 100 ppm vol of sulfur oxides.

11. The process as claimed in claim 1, wherein the CO2-rich fluid contains less than 2,000 ppm vol of sulfur oxides.

12. The process as claimed in claim 1, wherein the CO2-rich fluid contains less than 20,000 ppm vol of sulfur oxides.

13. The process as claimed in claim 1, wherein the mixture at an inlet of the phase separator is at a temperature between −35° C. and −15° C.

14. The process as claimed in claim 1, wherein the mixture at an inlet of the phase separator is at a temperature between −25° C. and −15° C.

15. A unit for compressing a CO2-rich fluid comprising CO2 and water, the unit comprising:

a compressor;
   a degassing column having a top and a bottom, the bottom configured to receive a second portion of the CO2-rich fluid, the degassing column configured to separate the second portion of the CO2-rich fluid into a liquid phase and an overhead gas;

an antifreeze inlet line configured to inject antifreeze into a first portion of the CO2-rich fluid to create an antifreeze-containing CO2-rich fluid;

a cooling device in fluid communication with the degassing column and the antifreeze inlet line, the cooling device configured to receive a mixture comprising the overhead gas and the antifreeze-containing CO2-rich fluid and cool said mixture to form a cooled mixture, the cooling device being located downstream the antifreeze inlet line;

a phase separator in fluid communication with the cooling device, the phase separator configured to receive the cooled mixture and to extract water from the cooled mixture thereby leaving a cooled CO2-rich fluid, the phase separator having a liquid outlet in fluid communication with the top of the degassing column such that the extracted water is introduced from the liquid outlet of the phase separator to the top of the degassing column, the phase separator having a gaseous outlet in fluid communication with the compressor such that the cooled CO2-rich fluid is introduced from the gaseous outlet of the phase separator to the compressor;

wherein the compressor is disposed downstream the antifreeze inlet line, the degassing column, the cooling device, and the phase separator.

16. The unit as claimed in claim 15, wherein the compressor is made of carbon steel or weakly alloyed steel.

17. The unit as claimed in claim 15, comprising a second compressor configured to compress the second portion of the CO2-rich fluid upstream of the degassing column.

18. The process as claimed in claim 1, further comprising the step of compressing the second portion of the CO2-rich fluid prior to the step of sending the second portion of the CO2-rich fluid to a bottom of a degassing column.

* * * * *